(No Model.) 3 Sheets—Sheet 1.
J. & G. G. HEALEA.
CORN CONVEYER.
No. 412,847. Patented Oct. 15, 1889.
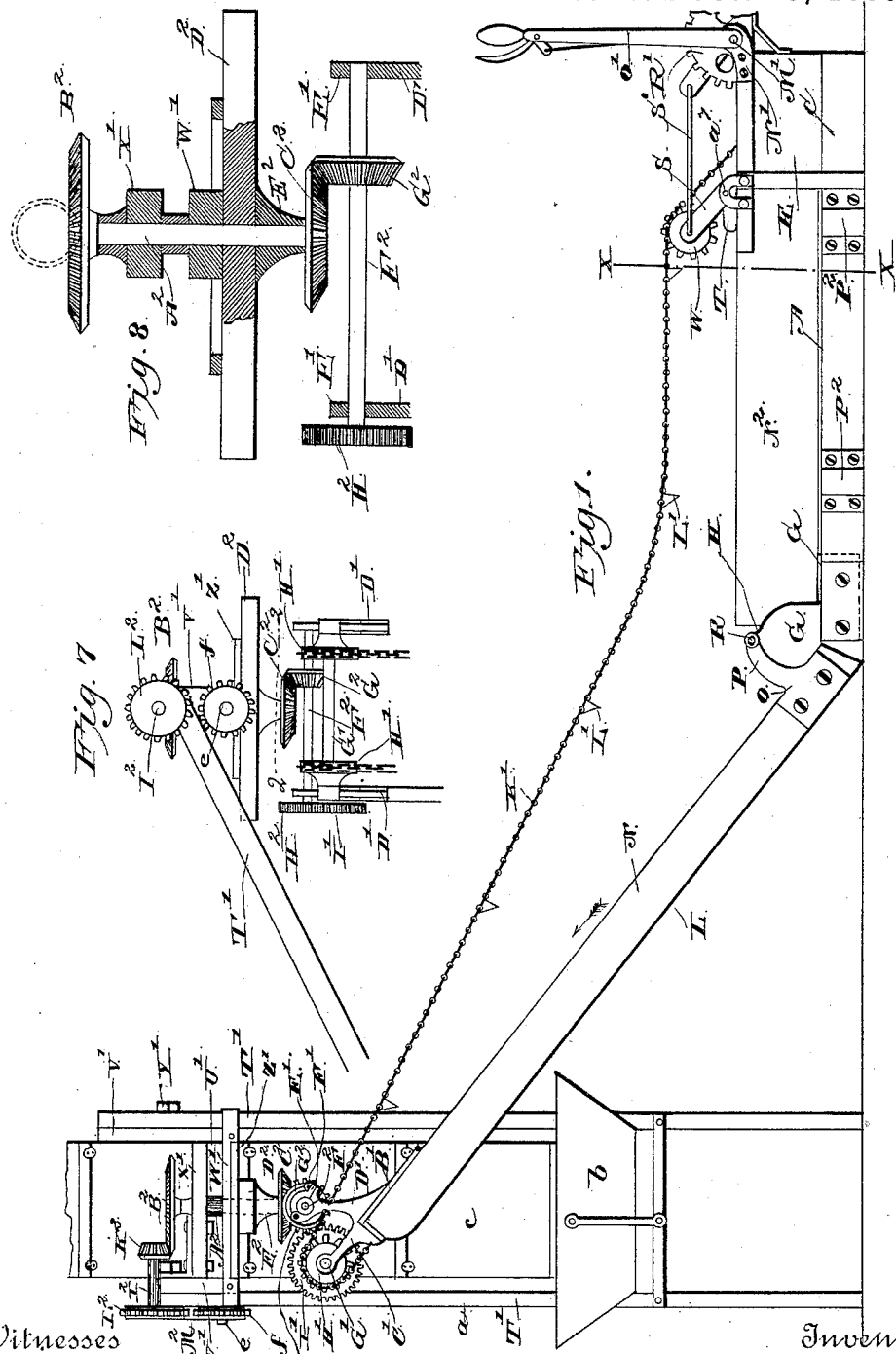
Witnesses
M. Fowler
J. W. Garner
Inventors
John Healea and
George G. Healea
By their Attorneys

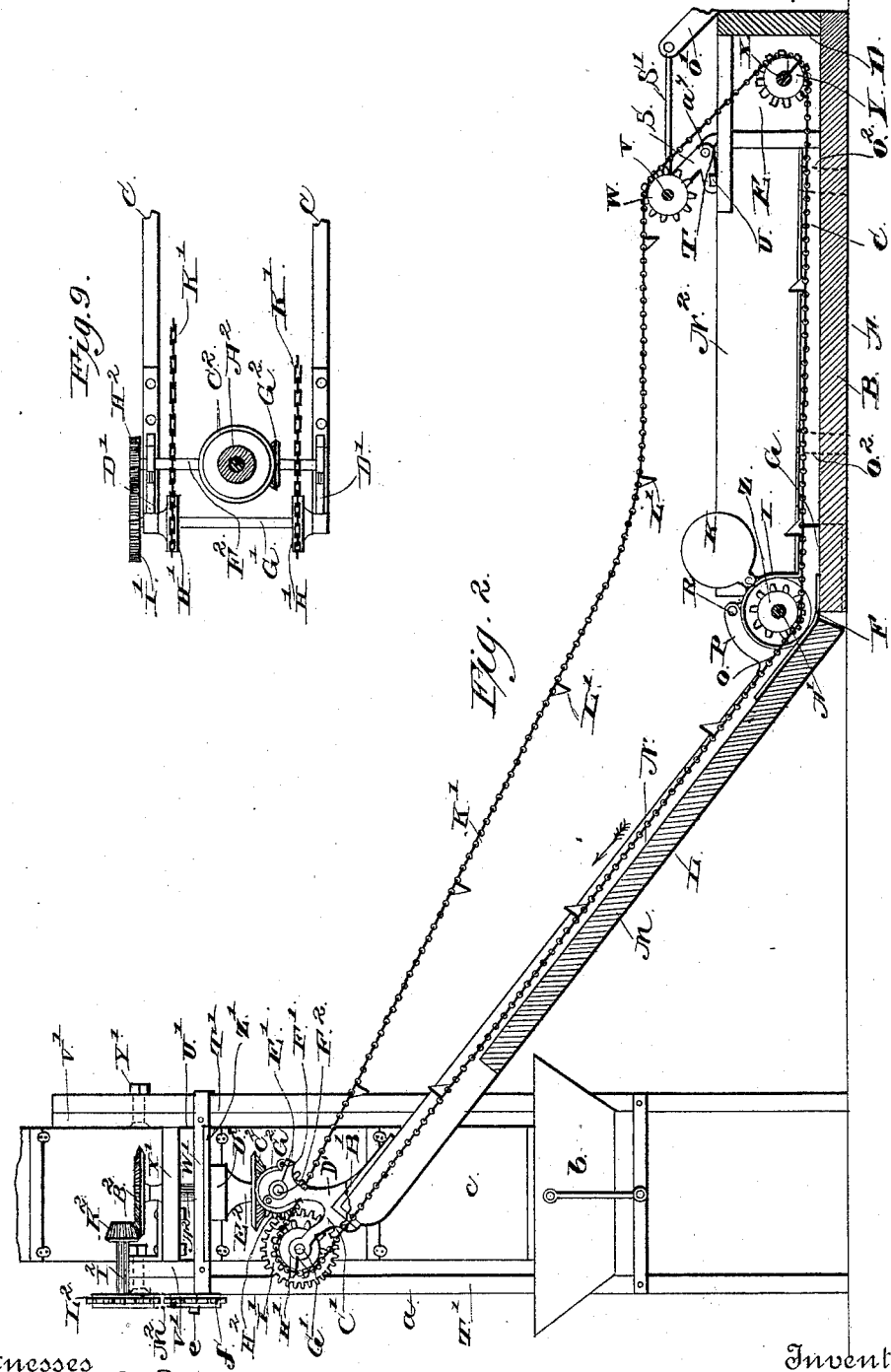

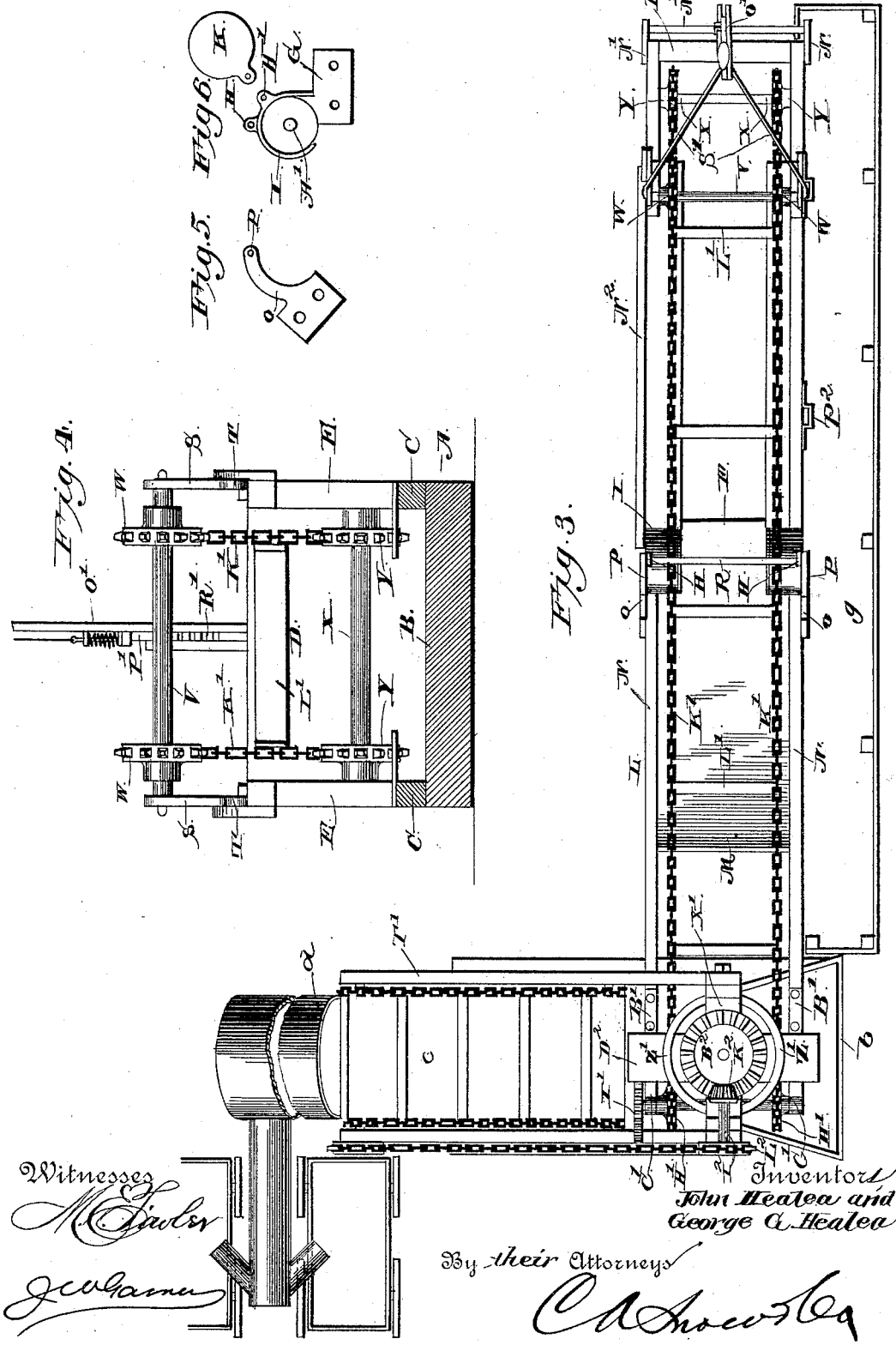

UNITED STATES PATENT OFFICE.

JOHN HEALEA AND GEORGE G. HEALEA, OF LE ROY, ILLINOIS, ASSIGNORS OF ONE-HALF TO WILLIAM HAMMOND, OF SAME PLACE.

CORN-CONVEYER.

SPECIFICATION forming part of Letters Patent No. 412,847, dated October 15, 1889.

Application filed October 3, 1888. Serial No. 287,046. (No model.)

*To all whom it may concern:*

Be it known that we, JOHN HEALEA and GEORGE G. HEALEA, citizens of the United States, residing at Le Roy, in the county of McLean and State of Illinois, have invented a new and useful Improvement in Corn-Conveyers, of which the following is a specification.

Our invention relates to an improvement in conveyers for carrying corn from a corn-crib to a corn-shelling machine; and it consists in the peculiar construction and combination of devices that will be more fully set forth hereinafter, and particularly pointed out in the claims.

The object of our invention is to provide a corn-conveyer which is adapted to be attached to and operated by a corn-shelling machine, and which is so arranged that it may be moved to either side of the corn-shelling machine or extended therefrom at any desired angle.

A further object of our invention is to provide a corn-conveyer which is adapted to be folded into as small a compass as possible when the same is stored or in transit; and a further object of our invention is to provide an apparatus by means of which the endless conveyer may be kept at all times sufficiently tight to insure the operation of the apparatus.

In the accompanying drawings, Figure 1 is a side elevation of a corn-conveyer embodying our improvements, showing the same attached to a corn-shelling machine of ordinary form. Fig. 2 is a vertical longitudinal sectional view of our improved corn-conveyer. Fig. 3 is a top plan view of the same and a diagrammatic representation of the corn-sheller and of the corn-crib to indicate the relative arrangement thereof. Fig. 4 is a vertical transverse sectional view taken on the line $x\,x$ of Fig. 1. Figs 5 and 6 are detail views. Fig. 7 is a detail side elevation of the supporting-frame and the connections between the conveyer and the same at right angles to that shown in Fig. 1. Fig. 8 is an enlarged detailed sectional view of the driving mechanism on the shafts $A^2$ and $d^3$. Fig. 9 is a longitudinal sectional view of the same on the line 2 2 of Fig. 7.

A represents a horizontal trough, which comprises a longitudinal bottom board B and the flanges or sides C. The outer end of the trough is closed by a vertical wall or board D, which is much higher than the flanges or sides C, and the outer ends of said flanges or sides are provided with vertical extensions E, which are secured to the ends of the board or wall D and are of the same height as the latter. To the inner end of the board B, on the upper side thereof, is secured a transverse plate F, which is made of metal and is curved upward in the direction of its length, as shown, and projects for a considerable distance beyond the end of the board B. On the outer sides of the trough A, at the inner end thereof, are secured vertical plates G, which are provided with the lugs H H', that are on the upper side of the plates. Formed with the inner sides of the said plates are semicircular casings I, which have their lower sides open, and pivoted to the inner ends of the said casings, near the upper sides thereof, are circular shields or covers K, which are adapted to be closed against the inner open sides of the casing.

L represents an inclined trough, which comprises the bottom board M and the side boards or bars N. The latter are longer than the board M and project beyond the outer end end thereof. On the outer sides of the trough L, near the inner end thereof, are bolted castings or plates O, which have the curved arm P. The latter have their outer ends bearing against the outer sides of the lugs H, and a hinged rod or bolt R passes through aligned openings in the said arms P and lugs H, and thereby connects the troughs A L together and permits the trough L to be inclined to any desired angle and to be folded over the trough A and thereby reduce the length of the conveyer when it is desired to store or transport the same.

The plate F, which projects from the inner end of the trough A, overlaps the proximate end of the trough L and serves to cover the space or opening between the meeting ends of the said troughs.

S represents a pair of arms or standards, which have their lower ends pivoted, as at $a^7$, to the upper inner corners of the vertical extensions E of trough A and above the trough and out of the vertical plane thereof. The lower ends of the said arms or standards S are provided with right-angled extensions T, from the inner sides of which project studs or stops U, said stops extending over and above the upper edge of the side wall of the trough. The said arms S are provided at their upper ends with bearings in which are journaled the ends of a shaft V. The said shaft is provided with a pair of sprocket-wheels W.

X represents a shaft which is journaled in bearings in the vertical extensions E and is provided with sprocket-wheels Y.

Z represents a pair of sprocket-wheels which are journaled on spindles A' in the centers of the casings I. The lower sides of the wheels Z and Y are only slightly above the bottom of the trough A.

B' represents a pair of castings which are secured to the outer end of the side boards or bars N, and are provided each with an outwardly-extending arm C' and with an upwardly-extending arm D'. To the upper ends of the arms D' are pivoted cap-plates E', which are adapted to be swung from the said arms D' or closed over the upper ends thereof, and bolts F' are provided, by means of which the said cap-plates may be bolted to the arms D', as shown in Fig. 1.

G' represents a shaft which is journaled in bearings in the outer ends of arms C'. To the said shaft is secured a pair of sprocket-wheels H', and to one end of said shaft is secured a spur-wheel I'.

K' represents a pair of endless sprocket-chains, which engage the wheels H', W, Y, and Z. The said sprocket-chains are connected together at suitable intervals by transverse flights L', and said chains and flights constitute an endless carrier.

M' represents a rock-shaft, which is journaled in a pair of bearings N', that project from the outer end of the trough A. To the said rock-shaft is attached a lever O', which is provided with a locking-bolt P', that is adapted to engage a toothed sector R' and thereby secure the lever at any desired position. The said lever is connected to the pivoted arms or standards S by means of a pair of link-rods S', and thereby the latter may be turned to any desired inclination by operating the lever O', and consequently cause the wheels W to tighten or loosen the endless sprocket-chains according to the angle at which trough L is arranged.

The stops U are adapted to come in contact with the upper edges of the vertical extensions or walls E when the arms or standards S are turned to nearly a horizontal position, as shown in Fig. 2.

$a$ represents the corn-shelling machine, which is of the form now in common use, is provided on its front side with the lower hopper $b$, and has an inclined endless elevator $c$ and an upper hopper $d$ at the upper end of the elevator, whereby the corn will be carried from the lower hopper and dropped into the upper hopper.

$e$ represents the driving-shaft of the corn-sheller, and $f$ represents a sprocket-wheel, which is attached to the said shaft.

T'' represents a pair of inclined beams, which are adapted to be secured to opposite sides of the case or frame of the corn-sheller, and which project from the upper front corner thereof.

U' represents a frame, which comprises a pair of vertical arms V', the cross-bar W', which connects the lower ends of the said arms, and a cross-bar X', which connects the said arms and is arranged a suitable distance above the bar W'. The arms V' are pivoted at a suitable distance from their upper ends, between the outer ends of the inclined beams T', by means of bolts Y', and thereby the frame U is adapted to swing in a vertical plane. To the under side of the bar W', at the center thereof, is secured a circular plate or ring Z'.

$A^2$ represents a vertical shaft which is journaled in central bearings in the bars W' and X', and has a miter-wheel $B^2$ at its upper end and a similar wheel $C^2$ at its lower end. Swiveled to the said shaft is a beam or plate $D^2$, which bears against the lower side of the ring or plate Z' and is adapted to swing or turn in a path at right angles to that of the frame U'. From the ends of the said beam or plate $D^2$ depend a pair of hangers $E^2$, having bearings at their lower ends, in which is journaled a shaft $F^2$. The said shaft has a wheel $G^2$, which engages the miter-wheel $C^2$, and to one end of the said shaft is keyed a spur-wheel $H^2$.

$I^2$ represents a shaft which is journaled in bearings in the upper ends of arms V'. To this shaft is secured a wheel $K^2$, which meshes with the wheel $B^2$, and to one end of the said shaft is secured a sprocket-wheel $L^2$, which is connected to the wheel $f$ by means of an endless sprocket-chain $M^2$, and thereby the motion of the driving-shaft $e$ of the corn-shelling machine is communicated to the shaft $I^2$, from the latter to the shaft $A^2$ by the gears $B^2$ and $K^2$, and from the shaft $A^2$ to the shaft $F^2$ by the gears $C^2$ and $G^2$.

The corn-shelling machine is arranged at a suitable distance from the corn-crib $g$, which is of the usual construction, and the shaft $F^2$ is engaged in bearings formed between the upper ends of the standards or arms D' and the cap-plates or arms E', and thereby the upper end of the inclined trough L and the conveyer are hinged to the said shaft and connected to the pivoted beam $D^2$. Consequently the said conveyer may be extended from the corn-shelling machine in any desired direction and disposed so that its trough A will lie alongside of the corn-crib. The upper end of the inclined trough L is above the lower hopper $b$ of the corn-sheller.

$N^2$ represents a stop-board or fender, which is provided near its ends with a pair of depending standards $O^2$, which are adapted to engage keepers $P^2$, that are on opposite sides of the horizontal trough A, and thereby the said stop-board or fender may be secured to either side of the said trough. Said stop-board or fender will be arranged on the side of the trough which is farthest from the corn-crib, and when the corn-shelling machine is set in motion the endless carrier will be caused to travel in the direction indicated by the arrow in Figs. 1 and 2, so that the flights on the lower side of the said carrier will move upward and outward on the bottoms of the troughs and nearly or quite in contact therewith. The ear-corn is discharged in suitable quantities from the crib into the trough A either by tearing out the slats or boards on the side of the crib which is above the trough or by shoveling the said corn from the crib into the trough, as may be preferred, and as the carrier travels on the bottoms of the troughs the corn is conveyed thereby to the upper end of the trough L, from which it falls into the lower hopper of the corn-shelling machine.

From the shelling-machine the shelled corn may be discharged directly into wagons or other suitable receptacles, as indicated in Fig. 3.

From the foregoing description it will be understood that the corn has to be handled only once between the corn-crib and the wagons while undergoing the process of being shelled.

Having thus described our invention, we claim—

1. The combination of the trough A, the wheels Y at the outer ends thereof, the wheels Z, journaled at the inner end of said trough, the trough L, hinged to the inner end of trough A, the wheels H' at the outer end of trough L, the pivoted standards S near the outer end of trough A, the wheels W, having their bearings in the said standards, the endless carrier connecting the wheels Y, Z, H', and W, and the lever connected to the standard S, whereby the latter may be inclined to any desired position to tighten or loosen the endless carrier, and thereby adjust the latter to suit the inclination of the trough L, substantially as described.

2. The combination of the frame U, adapted to be secured to a corn-shelling machine, the beam or plate $D^2$, pivoted to said frame and having the bearings $E^2$, the shaft $F^2$, having the wheel $H^2$, the vertical shaft $A^2$, journaled in frame U and geared to the shaft $F^2$, the shaft $I^2$, journaled in frame U and geared to the shaft $A^2$, the troughs A L, hinged together, the latter having the standards or arms D', adapted to be hinged to shaft $F^2$, the shaft G' in bearings in the outer end of trough L and having the sprocket-wheels H' and the gear I', the latter meshing with wheel $H^2$, the wheels Z at the inner end of trough A, the wheels Y at the outer end thereof, the pivoted arms S, the wheels W, having their bearings in said arms, the endless chains connecting the wheels H', Y, Z, and W, the flights connecting said chains, and means, substantially as set forth, to adjust the arms or standards S to any desired position, substantially as described.

3. The combination, with the shaft $I^2$, journaled in the corn-sheller frame and connected to the driving-shaft of the sheller, the shaft $A^2$, geared to the shaft $I^2$, the beam $D^2$, swiveled on said shaft, and the bearings $E^2$, of the shaft $F^2$, journaled in said bearings and geared to the shaft $A^2$, and the corn-conveyer having one end hinged to the bearing $E^2$ and having the endless carrier, the latter being geared to and operated by the shaft $F^2$, substantially as described.

In testimony that we claim the foregoing as our own we have hereto affixed our signatures in presence of two witnesses.

JOHN HEALEA.
GEO. G. HEALEA.

Witnesses:
CHAS. A. BARLEY,
HUTTON HUFFMAN.